United States Patent [19]
Ciarrocchi

[11] Patent Number: 6,023,811
[45] Date of Patent: Feb. 15, 2000

[54] MODULAR TOOL TO REMOVE GROUT

[76] Inventor: Mark V. Ciarrocchi, 294 S. New Ardmore Ave., Broomall, Pa. 19008

[21] Appl. No.: 09/033,673

[22] Filed: Mar. 3, 1998

Related U.S. Application Data

[60] Provisional application No. 60/039,857, Mar. 5, 1997.

[51] Int. Cl.$^7$ .................................................. A47L 13/02
[52] U.S. Cl. ................................... 15/236.06; 15/236.08; 15/236.01; 30/169; 30/172
[58] Field of Search .......................... 15/236.08, 236.06, 15/236.05, 236.01, 235.3, 235.8, 245.1; 30/169, 172, 517, 503, 503.5, 507

[56] References Cited

U.S. PATENT DOCUMENTS

| | | | |
|---|---|---|---|
| 764,374 | 7/1904 | Remsen | 30/503.5 |
| 854,725 | 5/1907 | Devers | 15/236.08 |
| 951,135 | 3/1910 | Kyte | 30/172 |
| 2,546,577 | 3/1951 | Young | 15/236.08 |
| 2,718,654 | 9/1955 | Draughn | 15/236.06 |
| 4,064,588 | 12/1977 | Cooper | 15/236.08 |

FOREIGN PATENT DOCUMENTS

| | | | |
|---|---|---|---|
| 552853 | 6/1932 | Germany | 15/236.01 |
| 804859 | 4/1951 | Germany | 15/236.08 |
| 283458 | 1/1928 | United Kingdom | 15/236.01 |
| 298710 | 10/1928 | United Kingdom | 15/235.3 |
| 2109286 | 6/1983 | United Kingdom | 15/236.05 |

*Primary Examiner*—Gary K. Graham
*Attorney, Agent, or Firm*—Alfred F. Hoyte, Jr.

[57] ABSTRACT

A modular, grout removal tool of adjustable thickness, to better accommodate grout joints of varying widths on all types of tiled surfaces. The tool has a handle with a pear-shaped cross section and a protrusion extending from and continuous with its substantially rectangular base. The protrusion has a substantially rectangular cross section and a lower relative height than the rest of the handle, which affords the tool access to hard-to-reach grout joints, such as those situated under overhangs created by cabinet and appliance edges. The protrusion also functions as a thumb rest during use. Rectangular flanges at the bottom of the base curve inward to define a slot extending into the base for a plurality off carbide-tipped saw blades. The blades have apertures aligning with apertures in the flanges to receive securing screws upon insertions of the blades into the slot. The blades are available having different thicknesses, so that using one blade, or a combination of blades, affords the grout-cleaning tool of the present invention modular properties, ultimately making it better suited for use with grout joints having a variety of physical characteristics. The handle shape provides a comfortable fit in the hand of a user, allowing it to be firmly grasped for manual reciprocation in grout removal and restoration. Furthermore, the relatively large modular grout-cleaning tool affords greater leverage and control, making grout-related tasks more efficient and less tiring.

3 Claims, 3 Drawing Sheets

MODULAR TOOL TO REMOVE GROUT

CROSS REFERENCE TO RELATED APPLICATIONS

This application is based on Provisional Patent Application No. 60/039,857 filed on Mar. 5, 1997.

BACKGROUND OF THE INVENTION

1. Field of the Invention

The present invention relates to hand tools, and more specifically to a hand-held, modular tool for use in cleaning, restoring and removing grout.

2. Description of the Relevant Art

Tiled surfaces incorporate interstitial grout, which often requires cleaning, restoration and removal, if replacement is warranted. The array of possible tile patterns for the walls and floors of bathrooms, kitchens and foyers accounts for a variety of grout joint characteristics. Available tools for use with grout, including well-known grout saws, lack the versatility to accommodate grout joints having larger surface areas, limiting them to use with thin, hard-to-reach grout joints. U.S. Pat. No. 4,156,966 discloses one such grout saw, having a single thin blade that engages an angled handle.

The grout-cleaning tool of U.S. Pat. No. 4,064,588 comprises a pear-shaped handle and a single thin saw blade that is secured by two screws in a slot bifurcating the small end of the handle. The grout-cleaning devices of '966 and '588 suffer from structural and functional inadequacies for their intended purpose. Often, the blades of these devices are much thinner than the width of the grout joint itself, making the devices difficult to control and prone to straying from the grout joint, thus scratching, marring or otherwise damaging the adjacent tile surfaces. Furthermore, the single thin blade and handle designs of these devices makes grout-related tasks clumsy, tedious, uncomfortable and exhausting for a user of these devices.

In light of the shortcomings of the above inventions and patents, there is a need for a modular grout-removal tool that not only accommodates grout joints of varying physical characteristics, but also affords a user sufficient control of the device so as to prevent damaging adjacent tile surfaces. Also, there is a need for a modular grout-removal tool designed to simplify this task for a person using such a device.

None of the above inventions and patents, taken either singly or in combination, is seen to describe the instant invention as claimed.

SUMMARY OF THE INVENTION

The wide range of possible tile patterns accounts for a variety of grout joint characteristics. Available tools for use with grout, including well-known grout saws, lack the versatility to accommodate grout joints having larger surface areas, limiting them to use with thin, hard to reach grout joints. Furthermore, the single thin saw blade and handle designs of known grout removal tools makes grout-related tasks clumsy, tedious, uncomfortable and: exhausting for a user of these devices.

The disclosed grout removal tool comprises a handle having a pear-shaped cross section and a protrusion extending from and continuous with its base. The protrusion has a substantially rectangular slot formed therein and a lower relative height than the rest of the handle, affording the tool access to grout joints in hard-to-reach places, such as those situated under overhangs created by cabinet and appliance edges. The protrusion also functions as a thumb rest during use. The slot is defined by a pair of opposing flanges co-extending with and forming an integral part of the protrusion. The flanges, which are positioned at the bottom of the base curve inward, each defining opposingly disposed pairs of apertures. The slot extends into the base and accommodates a predetermined plurality of carbide-tipped saw blades. The blades each define a pair of opposingly disposed apertures, which align with the apertures defined by the flanges to receive securing screws (e.g., common push-pull securing screws) upon insertion of the blades into the slot. The screws removably secure the blades within the slot by urging the flanges toward each other to compress blades therebetween. The blades are available having different thicknesses, so that using one blade, or a combination of blades, affords the grout cleaning tool of the present invention modular properties, ultimately making it better suited for use with grout joints having a variety of physical characteristics.

In the preferred embodiment of the invention, the handle is fabricated from plastic. The handle shape provides a comfortable fit in the hand of a user, allowing it to be firmly grasped for manual reciprocation in grout removal and restoration. Furthermore, the relatively large modular grout cleaning tool affords greater leverage and control, making grout treatment tasks more efficient and less tiring. The modular, interchangeable blade system of the present invention makes possible an adjustable blade thickness, to better accommodate grout joints of varying widths on all types of tiled surfaces.

Accordingly, it is a principal object of the invention to provide a modular grout-removal tool that accommodates grout joints of varying physical characteristics.

It is another object of the invention to afford a user sufficient control of the device when performing grout-related tasks, so as to prevent damaging the adjacent tiles surfaces.

It is a further object of the invention to simplify grout related tasks for the user of the device.

Still another object of the invention is to incorporate blades of varying thickness for different combined usages thereof Yet another object of the invention is to afford access to hard-to-reach grout joints, such as those situated under overhangs created by cabinet and appliance edges.

It is also an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
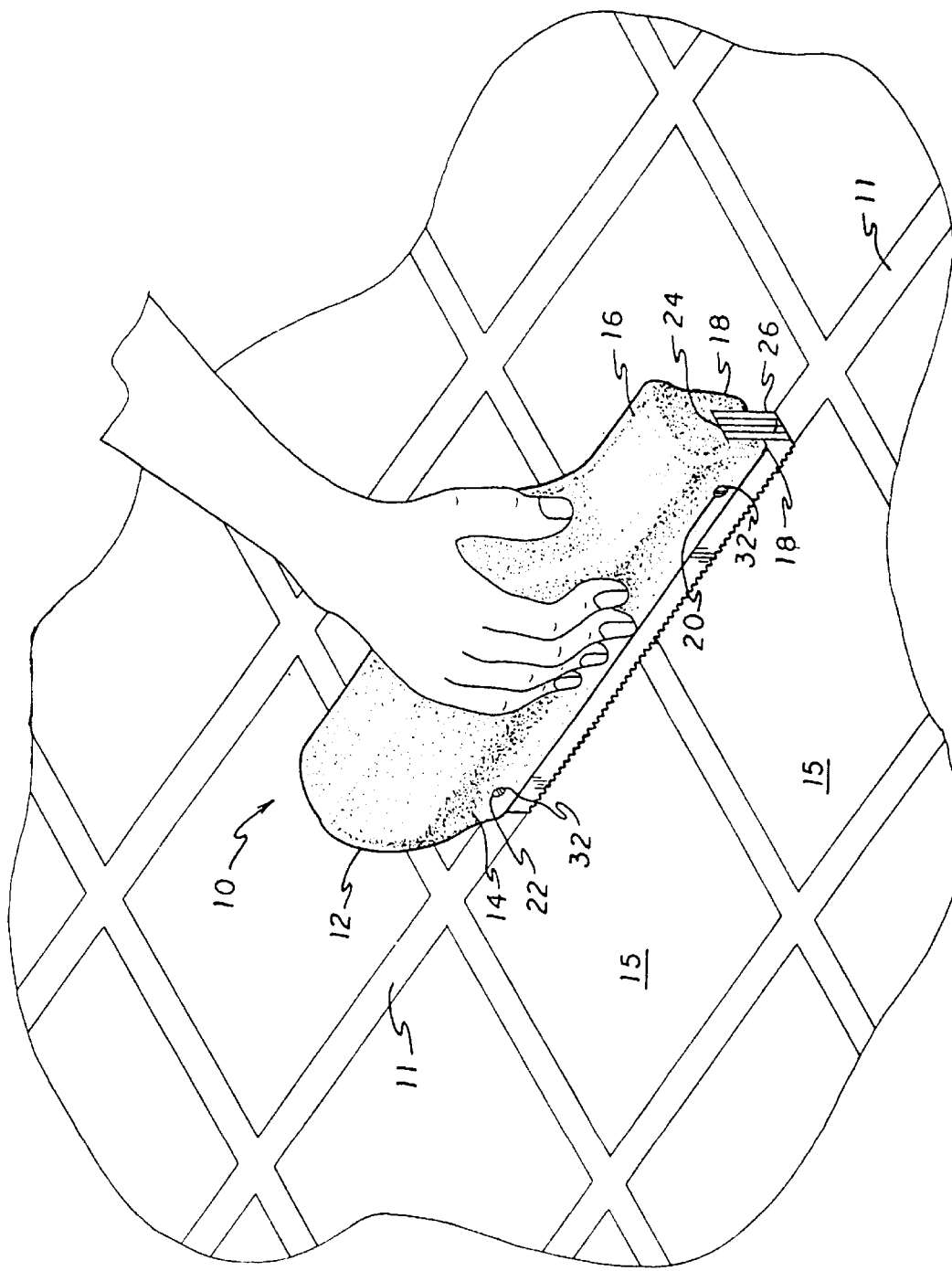
FIG. 1 is an environmental perspective view of the modular grout-removal tool of the present invention.

The present invention, herein generally indicated by the numeral 10, comprises a handle 12, having a substantially pear-shaped cross section and a protrusion 16 extending from and continuous with its base 14, as shown in FIG. 1. Flanges 18 integrally connect to the longer sides of the bottom of base 14. Flanges 18 extend in a downward direction and curve, inwardly. Each of flanges 18 defines two apertures 20,22, each disposed at opposite ends thereof Flanges 18 further define at slot 24 between them, which extends into the bottom of base 14.

Slot 24 accommodates a plurality of carbide-tipped saw blades 26, each blade having a linear formation of teeth of a very fine mesh size. Blades 26 each define two apertures 28, each disposed at opposite ends thereof Upon insertion of blades 26 into slot 24, apertures 28 are in registry with apertures 20,22, to receive screws 32. Screws 32, which are preferably of the readily available and common push-pin variety, removably secure blades 26 within slot 24 by urging flanges 18 toward each other to compress blades 26 therebetween. Any other convenient securing method may be used for this purpose, including screws or nut-bolt assemblies.

Figure 3:
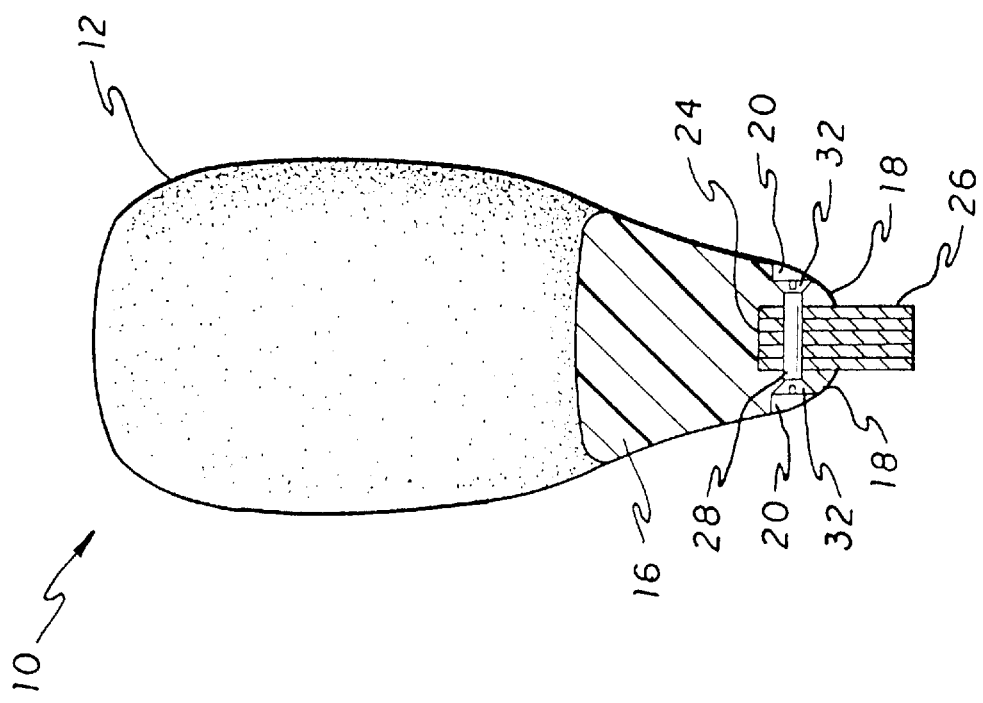
FIG. 3 is an elevational, cross-sectional view, of the modular grout-removal tool of the present inversion, drawn along lines 3—3 of FIG. 2.

Blades 26 are available and have different thicknesses, so that using one blade, or a combination of blades, affords the grout-cleaning tool of the present invention modular properties, ultimately making it better suited for use with grout joints having a variety of physical characteristics. FIG. 1 illustrates the modular, interchangeable blade system of the present invention 10, making possible an adjustable overall blade surface thickness with which to better accommodate grout joints 11 of varying widths on all types of tiled surfaces 15. Now referring to FIG. 3, up to six of blades 26 can be used at one time in slot 24. Blades 26 are immediately adjacent to each other, allowing a substantially continuous grout-contacting surface. In the preferred embodiment of the invention, blades 26 are 11 inches long, where handle 12 and slot 24 have corresponding dimensions to accommodate blades 26.

Figure 2:
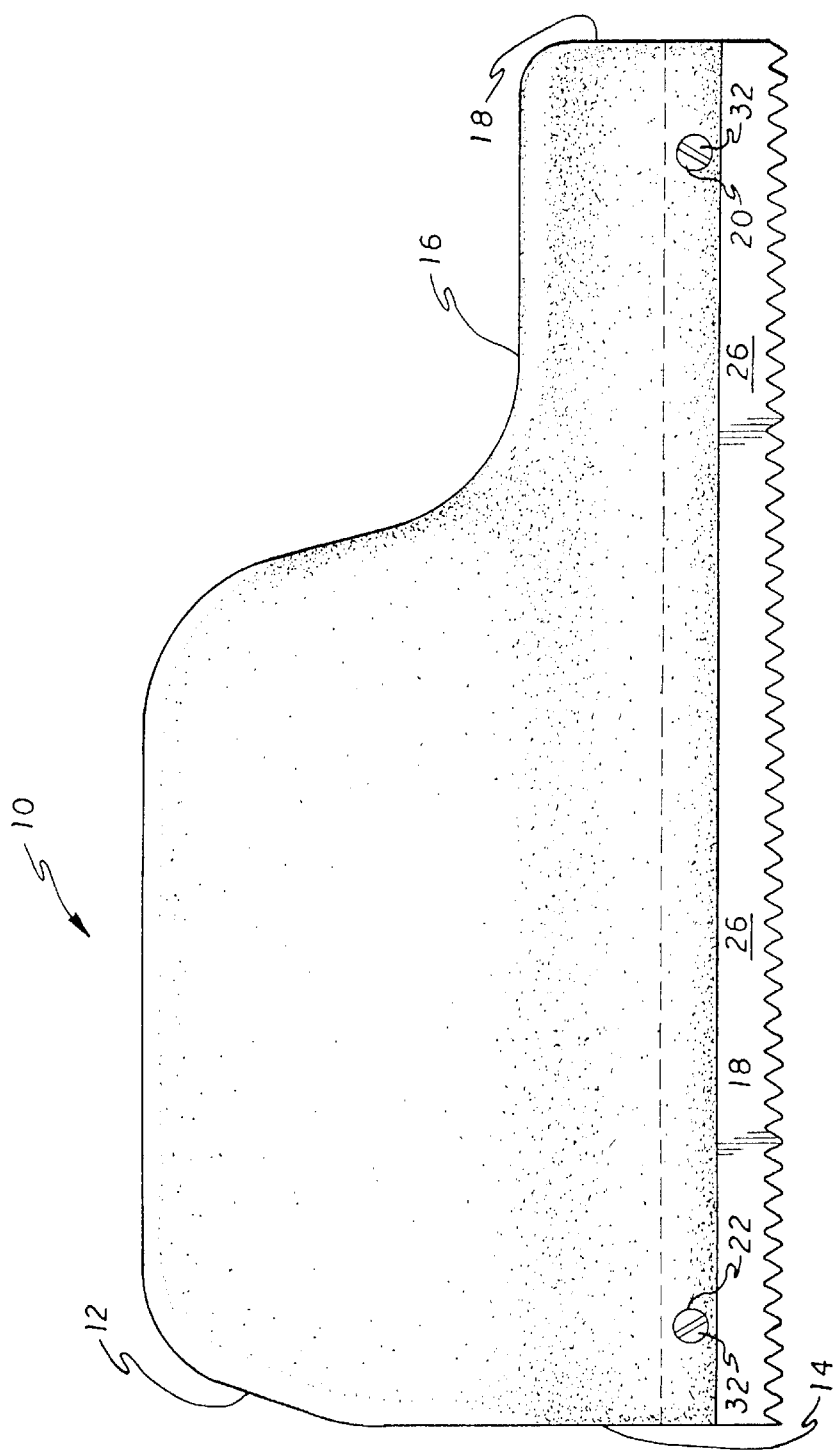
FIG. 2 is an elevational side view of the modular grout-removal tool of the present invention.

In the preferred embodiment of the invention, handle 12 is fabricated from plastic. The contoured shape of handle 12, illustrated in FIG. 2, provides a comfortable fit in the hand of a user, allowing it to be firmly grasped for manual reciprocation in grout removal and restoration. Protrusion 16 has a cross-section and a lower relative height than the rest of handle 12, which affords the tool access to grout joints in hard-to-reach places, such as those situated under overhangs created by cabinet and appliance edges Protrusion 16 also serves as a thumb support during use. Furthermore, modular grout-cleaning tool 10 is designed to be larger than existing grout saws, affording a user greater leverage and control, and making grout related tasks more efficient and less tiring as well.

Instead of a single open slot 24 being provided for the blades 26, other configurations are possible, whereby any preselected number of blades mounted in the slot are surely and securely mounted. For example, spacing washers or flat inserts could be inserted between blades when a lesser number are employed. Alternatively, the handle 12 itself could include depending walls between blades (not shown) when fewer blades than shown in the drawings are to be used.

It is to be understood that the present invention is no limited to the embodiments described above, but encompasses any and all embodiments within the scope of the following claims.

I claim:

1. A modular tool to remove grout comprising: an elongated handle, said handle having a substantially pear-shaped transverse cross section and a base with a protrusion extending therefrom and continuous with said base, a pair of flanges, said flanges extending along opposing sides at a bottom portion of said base and extending in a downward direction and curving inward towards each other, each of said flanges having two apertures therethrough, said apertures disposed at opposite ends thereof, and said flanges defining a slot therebetween, said slot extending into the bottom portion of said base; a plurality of carbide-tipped saw blades, said blades incorporating a linear formation of teeth, and each of said blades defining two apertures, said apertures disposed at opposite ends thereof, said blades insertable into said slot so that said apertures of said blade are in registry with said apertures of said flanges; and means for securing said blades within said slot, said apertures of said blades and said apertures of said flanges receiving said blade-securing means, said blade-securing means urging said flanges toward each other to compress said blades therebetween.

2. The modular tool to remove grout according to claim 1, wherein said blade-securing means comprise a plurality of screws.

3. The modular tool to remove grout according to claim 1, wherein said blades, once inserted into said slot and secured therein, are immediately adjacent to each other, thus to form, in such assembly, a substantially continuous grout-contacting surface.

* * * * *